United States Patent [19]

Tanaka et al.

[11] Patent Number: 4,761,670

[45] Date of Patent: Aug. 2, 1988

[54] COLOR IMAGE REPRODUCTION DEVICE

[75] Inventors: Hironori Tanaka; Matahira Kotani; Masafumi Matsumoto, all of Nara, Japan

[73] Assignee: Sharp Kabushiki Kaisha, Japan

[21] Appl. No.: 88,081

[22] Filed: Aug. 21, 1987

[30] Foreign Application Priority Data

Sep. 5, 1986 [JP] Japan ............................ 61-210362

[51] Int. Cl.⁴ .................................. G03G 15/01
[52] U.S. Cl. ..................... 355/4; 355/3 R; 355/71
[58] Field of Search ............ 355/4, 3 R, 14 R, 71, 355/30 R, 38 E

[56] References Cited

U.S. PATENT DOCUMENTS

| | | | |
|---|---|---|---|
| 4,436,410 | 3/1984 | Komiya | 355/4 X |
| 4,519,703 | 5/1985 | Lehman et al. | 355/71 X |
| 4,578,331 | 3/1986 | Ikeda et al. | 355/4 X |
| 4,580,889 | 4/1986 | Hiranuma et al. | 355/4 |
| 4,690,543 | 9/1987 | Watanabe | 355/4 |

Primary Examiner—A. C. Prescott
Attorney, Agent, or Firm—Flehr, Hohbach, Test, Albritton & Herbert

[57] ABSTRACT

A color image reproduction device such as a color copier includes a single light source surrounded by a cylindrical unistructural filter with red, green and blue sections such that red, green and blue beams of light are sequentially transmitted to a colored document as the filter is rotated around the source. Reflected color beams are sequentially made incident on a photosensitive film coated with yellow, magenta and cyanic ink particles which harden by exposure to red, green and blue beams of light, respectively, such that a colored image can be formed by a single scan of the document.

9 Claims, 3 Drawing Sheets

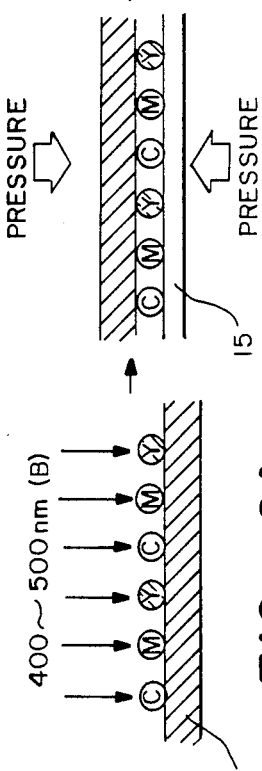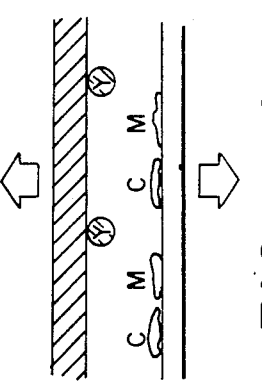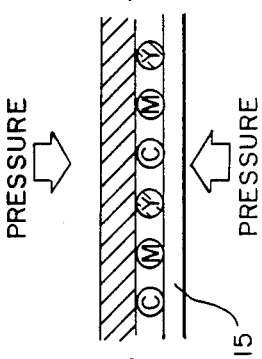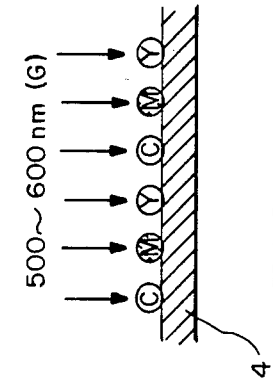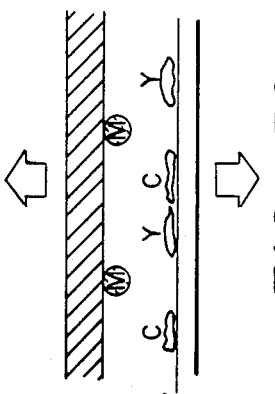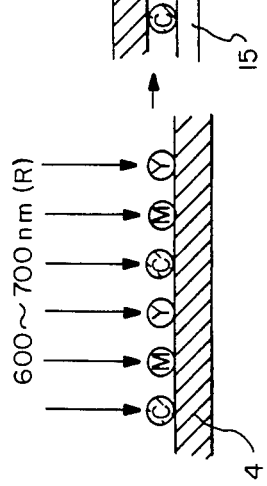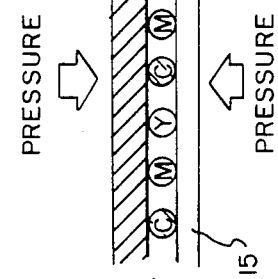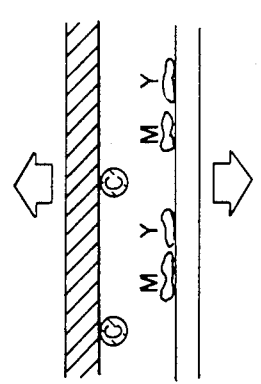

COLOR IMAGE REPRODUCTION DEVICE

BACKGROUND OF THE INVENTION

This invention relates to an optical device for reading and reproducing a colored image such as a color copier and more particularly to a new color image reproduction device which does not require image reading elements such as CCD image sensors and with which a colored image can be read and reproduced by a single scan.

With a prior art device for reading and reproducing a colored image described, for example, in Japanese Patent Publication Tokkai No. 55-162174, a colored original document is sequentially exposed to red (R), green (G) and blue (B) beams of light with different spectroscopic radiation characteristics and reflected beams from the colored original are taken in by a CCD image sensor with the help of mirror and lenses. They are then sequentially taken out in synchronism with the timing of emission of the aforementioned red, green and blue beams so as to provide individual image data for these colors, and color data for yellow (Y), magenta (M), cyanic (C) and black (Bk) are generated therefrom through a color conversion process on these image data. A color image can be obtained from such color data by transferring yellow, magenta, cyanic and black inks, for example, by a thermal transfer recording method.

A color image reproduction device of the type described above cannot escape from being complex, large and costly because it must include separate light sources for emitting red, green and blue beams of light, a device for controlling the timing of light emission, CCD image sensors, a device for controlling the timing for taking out electrostatic charges, a device for processing color conversion, a thermal transfer and recording device and yellow, magenta, cyanic and black ink ribbons.

SUMMARY OF THE INVENTION

It is therefore an object of the present invention to view of the above to provide a color image reproduction device which does not require a plurality of light sources but can read and reproduce colored images with a simple structure requiring no CCD image sensors.

The above and other objects of the present invention are achieved by providing a new color image reproduction device having a unistructural filter with red, green and blue sections in a cylindrical form which is disposed around a single light source and makes on revolution in synchronism with the motion of an original by one unit such that the red, green and blue beams of light are sequentially made incident thereon. Reflected beams of light are directed through a lens system onto a photosensitive film and the exposed film is pressed against a sheet of recording paper such that ink particles on the film are transferred onto the recording sheet. Thus, the present invention not only provides a color image reproduction device with a simplified structure but also reduces the processing time because a colored image can be read and reproduced by a single scan.

BRIEF DESCRIPTION OF THE DRAWINGS

The accompanying drawings, which are incorporated in and form a part of the specification, illustrate embodiments of the present invention and, together with the description, serve to explain the principles of the invention. In the drawings.

DETAILED DESCRIPTION OF THE INVENTION

Figure 1:
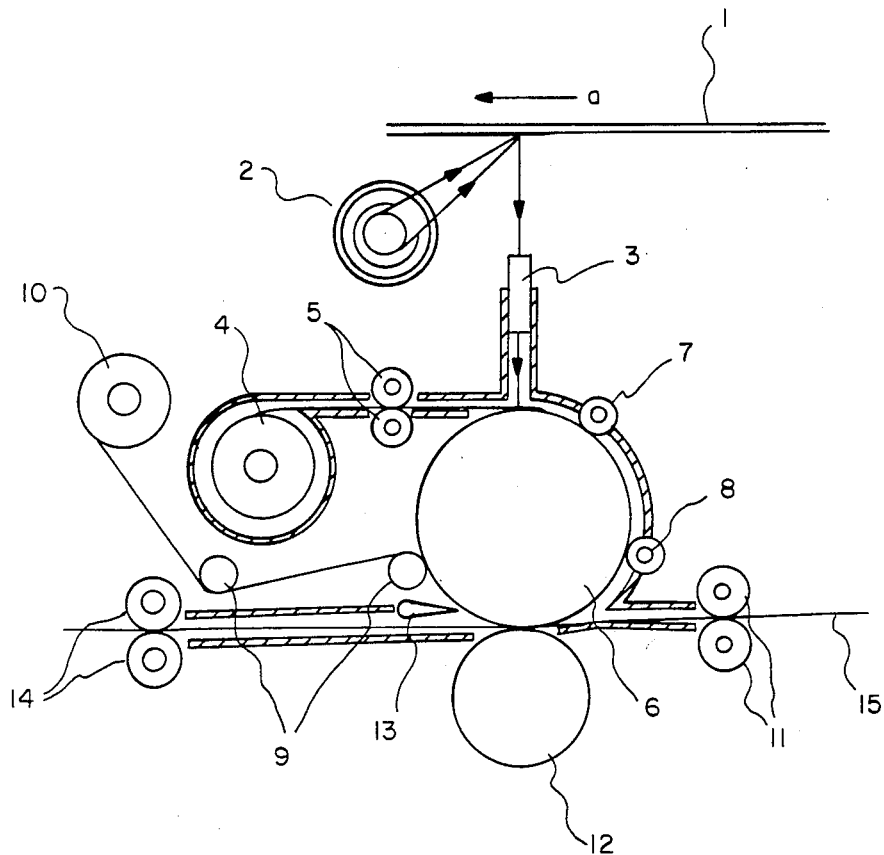
FIG. 1 is a schematic drawing showing the structure of a color image reproduction device embodying the present invention.

With reference to FIG. 1, numeral 1 indicates a colored document to be read and reproduced and is intermittently transported in the direction of the arrow a, for example, by a pulse motor. Numeral 2 indicates a light source unit for emitting red, green and blue light beams. The source unit 2 includes a unistructural rotary filter having red, green and blue parts, as will be described below. As this filter is rotated, red, green and blue light beams are sequentially emitted from the source unit 2. Numeral 3 indicates a leans for receiving the red, green and blue beams reflected from the document 1 and directing them onto a photosensitive film 4 which is originally stored in the form of a roll. The film 4 is guided by a series of rollers 5, 7, 8 and 9 and the used film is taken up by a take-up device 10. Numeral 6 indicates a drum which serves as a fixing roller. The drum 6 not only supports the photosensitive film 4 at an exposure position but also guides the exposed film to a position for the fixing process. Numeral 11 indicates feed rollers for transporting to the aforementioned fixing position a sheet of recording paper 15 on which a colored image is intended to be recorded. Numeral 12 indicates a principal fixer roller which, working with the drum 6, serves to apply a pressure on the exposed film 4 and the recording sheet 15 such that colored data recorded on the film 4 are tightly pressed onto the recording sheet 15. Numeral 13 indicates a doctor blade for forcibly separating the photosensitive film 4 from the recording sheet 15 which were pressed tightly against each other for fixing. Numeral 14 indicates discharge rollers for transporting out of the device the recording sheet 15 onto which a colored image has been recorded.

Next, FIGS. 4A, 4B, 4C, 5A, 5B, 5C, 6A, 6B and 6C are referenced for a detailed explanation of the principles on which the present invention is based. The surface of the photosensitive film 4 is coated with yellow, magenta and cyanic ink particles which harden by light respectively in different wavelength ranges. More in detail, cyanic ink particles harden by red light of 600 nm–700 nm, magenta ink particles harden by green light of 500 nm–600 nm and yellow ink particles harden by blue light of 400 nm–500 nm. In these figures, ink particles are schematically represented by circles with letters C, M and Y, respectively, and shaded circles indicate hardened particles. FIG. 4A shows a situation where a red beam of light with wavelength in the range of 600 nm–700 nm is made incident upon the photosensitive film 4, causing thereby cyanic ink particles to harden. If a sheet of recording paper is contacted with the photosensitive film 4 under this condition and a pressure of about 350 kg/cm² is applied on them from both sides as shown in FIG. 4B, the magenta and yellow ink particles which have not been hardened by the aforementioned exposure to the red beam of light and still remain soft are crushed and fixed on the recording sheet as shown in FIG. 4C. In summary, the red light causes recording on the sheet with magenta and yellow particles having the red color component.

FIG. 5A shows a situation where a green beam of light with wavelength in the range of 500 nm–600 nm is made incident on the photosensitive film 4 described above and magenta ink particles are hardened as shown in FIG. 5B such that cyanic and yellow ink particles are crushed as shown in FIG. 5C under a similar pressure to produce a green image because cyanic and yellow are color component of green. Similarly, FIG. 6A shows a situation where a blue beam of light with wavelength in the range of 400 nm–500 nm is made incident on the photosensitive film 4 and yellow ink particles are hardened as shown in FIG. 6B such that cyanic and magenta ink particles are crushed as shown in FIG. 6C under a pressure to produce a blue image because cyanic and magenta are color components of blue. Accordingly, if reflected light including red, green and blue beams from a unit area of the colored document 1 is sequentially made incident upon the same unit area on the photosensitive film 4, the ink particles coating the surface of the film 4 are sequentially hardened in the manner described above such that a full-color image is finally recorded.

Figure 2:
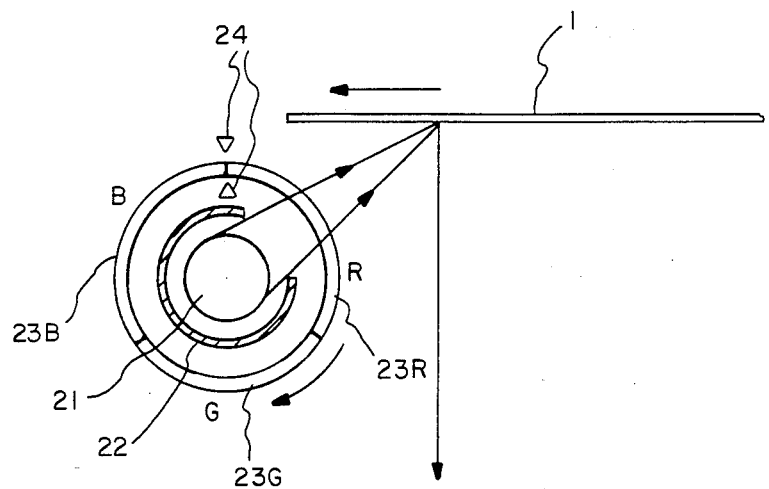
FIGS. 2 and 3 are schematic drawings showing the structure of the light source unit of the device of FIG. 1, and FIGS. 4A, 4B, 4C, 5A, 5B, 5C, 6A, 6B and 6C are schematic drawings showing the basic principle of the photosensitive film used with the device of FIG. 1.

Next, the timing with which red, green and blue light beams are emitted from the source and the timing with which the original document is transported and the drum is rotated are explained with reference to FIG. 2. FIG. 2 shows the structure of the light source unit 2 which includes a light source 21 such as a fluorescent lamp. Disposed around the periphery of the source 21 are a screening means 22 for screening the light beams from the source 21 to define a light path and a cylindrical unistructural rotary filter 23 having red, green and blue sections 23R, 23G and 23B. Numeral 24 indicates a photosensor for detecting each complete revolution of the filter 23, for example, by detecting a slit provided to the cylindrical filter 23 along the boundary between two color sections (between the blue and red sections 23B and 23R according to the embodiment shown in FIG. 2).

At the beginning of a process for color image reproduction, the source 21 is first turned on and the filter 23 begins to rotate. This causes the light from the source 21 to initially pass through the red filter 23R to reach the colored document 1. As a result, a reflected beam with red optical component is transmitted through the lens 3 to the photosensitive film 4. Next, the light from the source 21 reaches the document 1 through the green filter 23G and a reflected beam with green component is transmitted through the lens 3 to the film 4. Still later, the light from the source 21 reaches the document 1 through the blue filter 23B and a reflected beam with blue component is transmitted through the lens 3 to the film 4. After the filter 23 completes a rotation and the exposure of the document 1 by red, green and blue beams of light is completed, this is detected by the photosensor 24. A pulse motor (not shown) for transporting the document 1 is activated in synchronism with detection by the photosensor 24 and moves the document 1 by one unit. At the same time, the drum 6 is turned by a fixed angle. This is repeated thereafter whenever the photosensor 24 detects a completed revolution of the filter 23.

Figure 3:
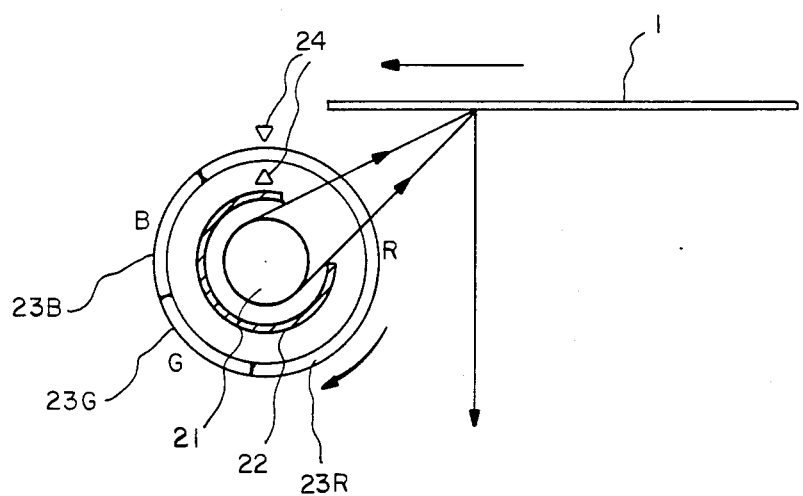

The foregoing description of a preferred embodiment of the invention has been presented for purposes of illustration and description. It is not intended to be exhaustive or to limit the invention to the precise form disclosed, and many modifications and variations are possible in light of the above teaching. For example, the cylindrical filter 23 need not be divided equally into the three sections 23R, 23G and 23B of the different colors are shown in FIG. 2. In view of the optical characteristics of the individual colors, a structure as shown in FIG. 3 may be considered preferable wherein the area of the red filter 23R is made relatively large because the red beam has the slowest response rise time among the three colors.

In summary, the present invention describes a color image reproduction device which does not require individual sources for red, green and blue light beams or light-receiving elements such as CCD image sensors because a new reproduction method has been adopted such that the structure of the device can be simplified and the time required for image reproduction can be reduced. Any modifications and variations that may be apparent to a person skilled in the art are intended to be included within the scope of this invention.

What is claimed is:

1. A color image reproduction device comprising
   an exposure means for exposing a colored document sequentially with red, green and blue beams of light,
   a photosensitive film having an ink layer containing ink particles of a plurality of color types, each of said color types reacting with incident light thereon according to the color or wavelength characteristic of said incident light to form colored image on said film,
   imaging means for receiving light reflected from said document and forming an image thereof on said photosensitive film,
   transferring-fixing means for transferring image data formed on said film onto a recording sheet and fixing said transferred image data on said recording sheet, and
   separating means for separating said recording sheet and said photosensitive film after said image data are transferred onto and fixed on said recording sheet.

2. The device of claim 1 wherein said exposure means includes
   a light source,
   screening means disposed coveringly around said light source and having an opening on its periphery, and
   a filter means with red, green and blue sections rotatably supported around said screening means.

3. The device of claim 2 wherein said opening is adapted to define a light path to said document and said filter means is cylindrical and adapted to cause red, green and blue beams of light sequentially transmitted to said document.

4. The device of claim 2 wherein the areas of said red, green and blue sections are differentiated according to optical characteristics.

5. The device of claim 1 wherein said transferringfixing means include a rotatable drum for advancing said photosensitive film on its cylindrical surface and a fixing roller for pressing said photosensitive film against said recording sheet.

6. The device of claim 5 wherein said drum is adapted to be rotated and said document is adapted to be advanced in synchronism with the rotation of said filter means.

7. The device of claim 1 further comprising a photodetector for detecting the revolution of said filter means.

8. The device of claim 1 wherein said ink particles include yellow, magenta and cyanic particles.

9. The device of claim 1 wherein said ink particles are hardenable selectively by exposure to red, green and blue beams of light.

* * * * *